Oct. 14, 1924.
W. J. WEINBERG
ADVERTISING DEVICE
Filed Jan. 21, 1924    2 Sheets-Sheet 1
1,511,791
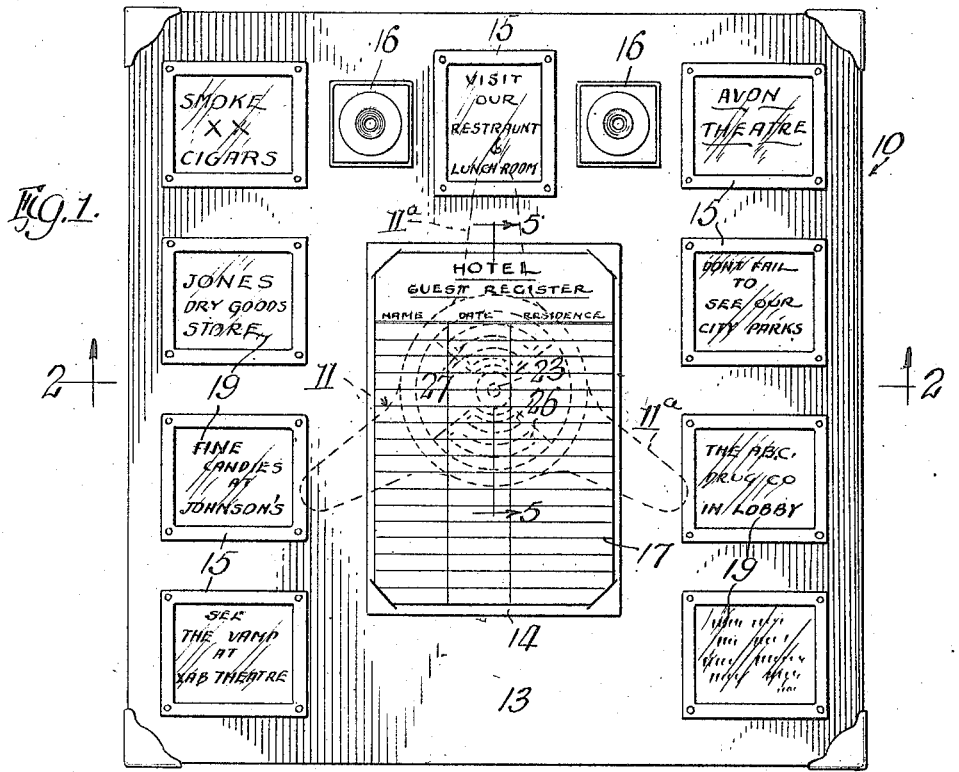
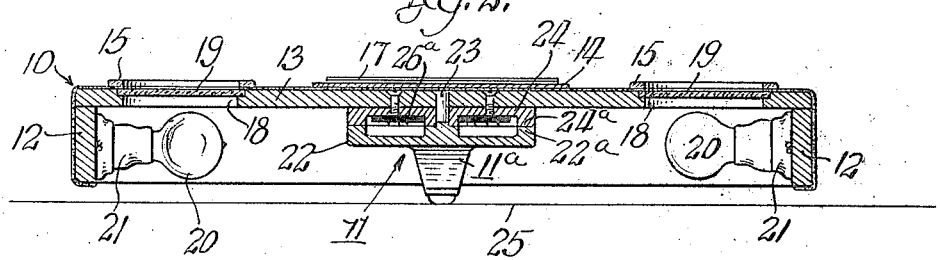
Inventor
William J. Weinberg Oct. 14, 1924.
W. J. WEINBERG
ADVERTISING DEVICE
Filed Jan. 21, 1924
1,511,791
2 Sheets-Sheet 2
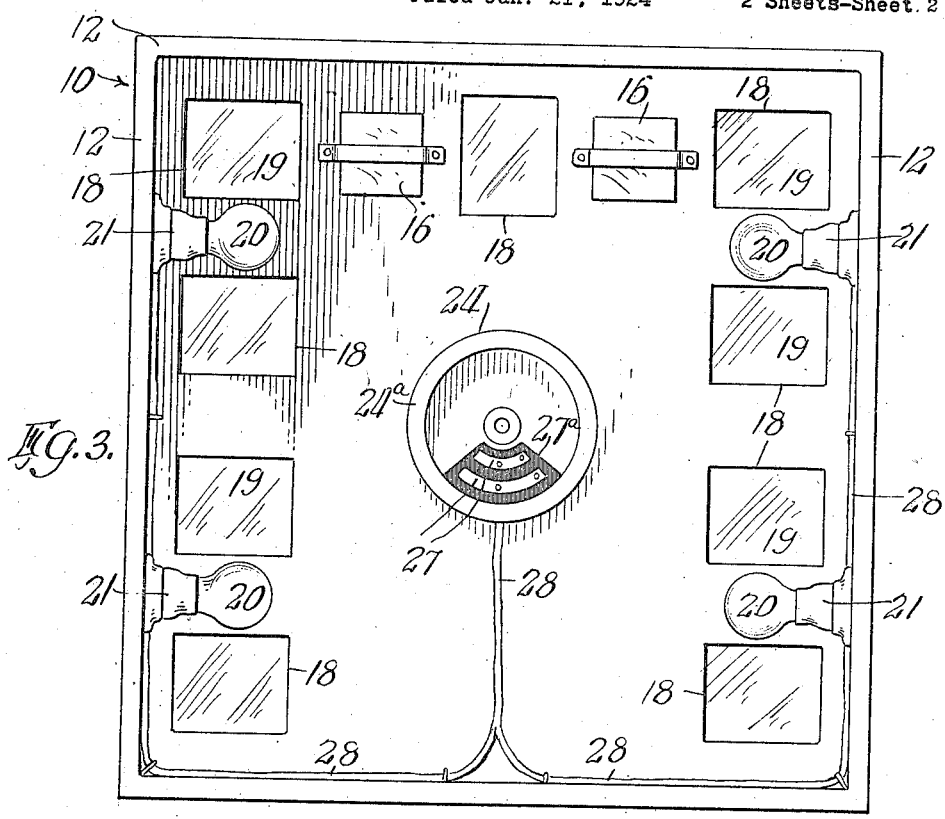
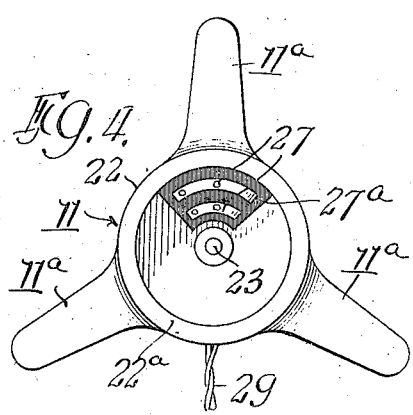
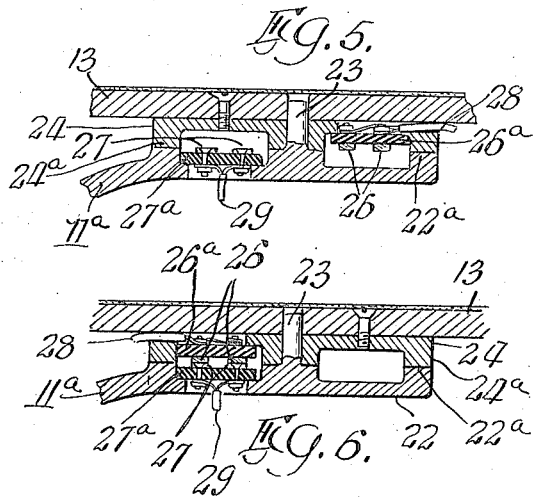
Inventor
William J. Weinberg Patented Oct. 14, 1924.

1,511,791

UNITED STATES PATENT OFFICE.

WILLIAM J. WEINBERG, OF CHICAGO, ILLINOIS, ASSIGNOR OF ONE-HALF TO FRED PARKER, OF CHICAGO, ILLINOIS.

ADVERTISING DEVICE.

Application filed January 21, 1924. Serial No. 687,461.

*To all whom it may concern:*

Be it known that I, WILLIAM J. WEINBERG, a citizen of the United States, and a resident of Chicago, in the county of Cook and State of Illinois, have invented certain new and useful Improvements in Advertising Devices; and I do hereby declare that the following is a full, clear, and exact description thereof, reference being had to the accompanying drawings, and to the letters of reference marked thereon, which form a part of this specification.

This invention relates to a novel and improved advertising device and consists of the matters hereinafter described and more particularly pointed out in the appended claims.

The invention relates more especially to an advertising device adapted for use in connection with a hotel register and its object is to bring instantly and forcibly to the attention of one using the register, as for example a hotel guest, certain advertising matter carried by the device. Such advertising matter, while carried by the device at all times and presented to view, is designed to be brilliantly illuminated and to be presented to compelling view by the guest at the instant the register, carried by the device, is brought to position before him so that he may inscribe his name thereon.

The advantages and novel features of the invention will be more clearly recognized as I proceed with my specification.

In the drawings:—

Fig. 1 represents a top plan view of the advertising device.

Fig. 2 is a view representing a transverse vertical section through the device in a plane indicated by the line 2—2 of Fig. 1.

Fig. 3 is a bottom plan view of a platform or frame which constitutes the support for the register and for the advertising matter carried by the device.

Fig. 4 is a view representing a top plan view of the base on which the platform is mounted.

Figs. 5 and 6 are views representing partial vertical sections through the device in a plane indicated by the line 5—5 of Fig. 1,—Fig. 5 representing the parts in one position and Fig. 6 indicating the parts in another position.

Referring now to that embodiment of the invention illustrated in the drawings:—10 indicates a platform and 11 indicates a base upon which the said platform is rotatably mounted. The platform 10 consists of a rectangular frame 12 open at the bottom and of a top board 13 which closes the top of the frame. The board is made of any convenient size to support a centrally located pad 14 and a plurality of advertising frames 15 arranged at the sides of the pad and also, as shown, at one end of the pad. Said board also carries the usual ink wells 16, 16 placed, as shown, at each side of one of the advertising frames 15. The pad is of familiar form and is designed to receive a sheet 17 from a loose leaf register. Instead of the pad of course an ordinary book register may be used, but the construction described is preferred, as most of the hotel registers now in use are of the loose leaf character.

The board 13 is provided below each of the frames 15 with a recessed opening 18 adapted to receive a translucent glass or other plate 19 on which is depicted the desired advertising matter. The simplest form of such plates are those like the ordinary lantern slides. The frames 15 are secured to the board 13 to retain the translucent advertising plates 19 in their recesses by means of screws, in such manner that they may be removed and the advertising plates changed as desired.

Lamps 20 are carried below the board 13 in any suitable manner, being as shown, secured in sockets 21 attached to the frame 12. Said lamps are so located that they will best illuminate the advertising plates 19 and, as shown, they are arranged, a lamp between each of a pair of plates, so that the light from one lamp will illuminate two plates. It is preferable that the lamps be not located immediately below the plates so that the light of the lamps will not be seen through the plates.

The base 11 carries a centrally disposed bearing plate 22 and journal pin 23. 24 indicates a bearing plate secured to the bottom of the board 13, the two bearing plates having circular rails 22ª, 24ª which provide a wide bearing between the board and the base. The journal pin 23 extends up through an aperture in the bearing plate 24 and part way through the board 13, so as to present as long a bearing as possible. The base proper is provided with a plurality of angularly disposed legs 11ª, said legs being of such vertical height as to raise the edges of the frame slightly above the desk or counter top 25 upon which the advertising device is supported. The opposed faces of the bearing plates 22, 24 have suitable recesses to provide an annular chamber for pairs of contacts 26 and 27,—the first carried by the upper plate 24 and the second carried by the lower plate 22, see Figs. 5 and 6. Said contacts in each case consist of short arcuate metallic bars secured to insulation blocks 26ª, 27ª respectively. 28, 29 indicate pairs of conductors, the first being connected to the pairs of contacts 26 and the second being connected to the pairs of contacts 27. The conductors 28 are connected in the usual manner to the lamp sockets 21, being carried about the frame 12 and attached thereto. The conductors 29 are connected to a suitable source of electric supply and lead from the base 11 and thence beyond the frame either through a hole in the counter or otherwise.

With the parts in the position shown in Fig. 5, which is the position corresponding to that shown in Fig. 1, where the hotel register sheet is presented facing the clerk of the hotel, the contacts 26, 27 are not engaged and the lamps are out. When a guest arrives, the hotel clerk swings the platform upon its central axis through an angle of 180° to bring the register sheet into position facing the guest, which brings the contacts 26, 27 into engaging position, as shown in Fig. 6. This instantly and brilliantly illuminates the advertising cards carried by the platform. After the guest has registered, the platform is swung in either direction back into position facing the clerk, which movement disengages the contacts and cuts out the lamps.

The advantages of the advertising features of this device and the compelling attention required by it of the guest to the several advertisements carried by the platform, will be understood upon a consideration of the operation of the device. When the guest approaches the counter, the advertising cards carried by the platform are dim and while they may be read by the ordinary light thrown on them from the outside, they are not in condition in any way to directly appeal to the guest approaching or standing at the counter. When the clerk asks the guest to register and swings the platform upon its axis into position to present the register to the guest, substantially at the instant that the register is brought to proper facing position with the guest, the advertising cards spring immediately into brilliant view, thereby forcibly attracting his attention to the matter carried by the cards. This result is produced both by the novelty of the effect and by the curiosity aroused as to how the effect is produced.

In describing the preferred embodiment of the invention illustrated in the drawings, I have referred to several details of mechanical construction and of arrangement of parts and in particular have described the register supporting platform as being mounted to rotate upon a base, in order to move the register from what may be termed a secondary position when facing the clerk, to a primary position, facing the guest who is to register; but it is to be understood that the invention is to be in no way limited to the specific mechanical construction and arrangement of parts shown in the drawings except in so far as may be pointed out in the appended claims.

I claim as my invention:—

1. An advertising device comprising a platform, a base supporting said platform, said platform being movable on said base between a secondary position and a primary position, a registering pad on said platform, luminant advertising cards located on the platform about said pad, means for illuminating said cards located below said platform, electric conductors leading to said illuminating means, and a switch device including a contact on said platform and a contact on said base adapted to be engaged by the first named contact when said platform is in its primary position only.

2. An advertising device comprising a base, a platform rotatable on said base between a secondary position and a primary position, a registering pad on said platform, an illuminated advertising card located on the platform adjacent said pad, means for illuminating said card, electric conductors leading to said illuminating means, and a switch device including a contact on said platform and a contact on said base, adapted to be engaged by the first named contact when said platform is in its primary position only.

In testimony that I claim the foregoing as my invention, I affix my signature in the presence of two witnesses, this 16th day of January, A. D. 1924.

WILLIAM J. WEINBERG.

Witnesses:
N. B. SULLIVAN,
T. H. ALFREDS.